(12) United States Patent
Lonergan et al.

(10) Patent No.: US 9,307,781 B2
(45) Date of Patent: Apr. 12, 2016

(54) THERMALLY PROCESSED SEED PRODUCT AND METHOD

(71) Applicant: Vista Innovation, LLC, Eden Prairie, MN (US)

(72) Inventors: Dennis Lonergan, Medina, MN (US); Robert J. Lewis, Festus, MO (US)

(73) Assignee: Vista Innovation, LLC, Eden Prairie, MN (US)

( * ) Notice: Subject to any disclaimer, the term of this patent is extended or adjusted under 35 U.S.C. 154(b) by 214 days.

(21) Appl. No.: 13/886,307

(22) Filed: May 3, 2013

(65) Prior Publication Data

US 2013/0302500 A1 Nov. 14, 2013

Related U.S. Application Data

(60) Provisional application No. 61/645,134, filed on May 10, 2012.

(51) Int. Cl.

| A23G 3/00 | (2006.01) |
|---|---|
| A23L 1/36 | (2006.01) |
| A23L 1/05 | (2006.01) |
| A23F 5/14 | (2006.01) |
| A23K 1/00 | (2006.01) |
| A23L 1/212 | (2006.01) |
| A23B 4/06 | (2006.01) |
| A23L 1/20 | (2006.01) |
| A23L 1/201 | (2006.01) |
| A23L 1/30 | (2006.01) |
| A01H 5/10 | (2006.01) |

(52) U.S. Cl.
CPC . *A23L 1/201* (2013.01); *A01H 5/10* (2013.01); *A23L 1/2001* (2013.01); *A23L 1/3002* (2013.01)

(58) Field of Classification Search
CPC ......... A23L 1/012; A23L 1/103; A23L 1/015; A23L 1/3002; A23G 1/48; A01H 5/10; A23J 1/14
USPC ............ 426/93, 578, 309, 615, 629, 507, 506
See application file for complete search history.

(56) References Cited

U.S. PATENT DOCUMENTS

| 2,813,796 A | 11/1957 | Keneaster et al. |
|---|---|---|
| 3,108,884 A | 10/1963 | Nielsen |
| 3,203,808 A | 8/1965 | Thompson et al. |
| 3,291,615 A | 12/1966 | Thompson et al. |
| 3,318,708 A | 5/1967 | Rockland et al. |
| 3,352,687 A | 11/1967 | Rockland et al. |
| 3,388,998 A | 6/1968 | Ozai-Durrani |

(Continued)

OTHER PUBLICATIONS

"Cholent and all Variations Ashkenazi and Sephardi Recipe". Available online at www.levanacooks.com on Feb. 24, 2010.*

(Continued)

*Primary Examiner* — Erik Kashnikow
*Assistant Examiner* — Assaf Zilbering
(74) *Attorney, Agent, or Firm* — McHale & Slavin, P.A.

(57) ABSTRACT

A food product and method are provided. The food product includes a pulse having a total water content below that of a fully hydrated pulse and a chewier texture. It is formed from a dry pulse and is hydrated, but only partially, resulting in a total water content in the range of between about 0.25 grams water/gram dry matter and about 0.75 grams water per gram dry matter. The pulse is in an intact form and has not been fully hydrated after harvest.

30 Claims, 4 Drawing Sheets (56) References Cited

U.S. PATENT DOCUMENTS

| | | |
|---|---|---|
| 3,495,989 A | 2/1970 | Lewis et al. |
| 3,635,728 A | 1/1972 | Rockland |
| 3,869,556 A | 3/1975 | Rockland et al. |
| 4,159,351 A | 6/1979 | Rockland et al. |
| 4,510,164 A | 4/1985 | Staley et al. |
| 4,729,901 A | 3/1988 | Rockland et al. |
| 5,545,425 A | 8/1996 | Wu |
| 5,562,938 A | 10/1996 | Lee et al. |
| 5,863,591 A | 1/1999 | Seguin |
| 6,090,433 A | 7/2000 | Sterner et al. |
| 6,183,797 B1 | 2/2001 | Dull |

OTHER PUBLICATIONS

Levy., "Internationsl Jewish Cookbook". Available online at www.HachetteBookGroup.com on Sep. 2009.*
Admony., "Hamin". from "Balaboosta" (2013).*
Shafaei et al., "Analysis of Water Absorption of Bean and Chickpea During Soaking Using Peleg Model". Journal of the Saudi Society of Agricultural Sciences (2014).*

* cited by examiner

THERMALLY PROCESSED SEED PRODUCT AND METHOD

CROSS REFERENCE TO RELATED APPLICATIONS

In accordance with 37 C.F.R 1.76, a claim of priority is included in an Application Data Sheet filed concurrently herewith. Accordingly, the present invention claims priority under 35 U.S.C. §119(e) to U.S. Provisional Application 61/645,134 entitled "THERMALLY PROCESSED SEED PRODUCT AND METHOD" filed on May 10, 2012. The contents of each of the above referenced applications are herein incorporated by reference in its entirety.

FIELD OF THE INVENTION

The present invention relates to a pulse that is cooked but has a lower water activity level and total water content than a fully hydrated pulse. The invention also includes high carbohydrate seeds.

BACKGROUND OF THE INVENTION

The present invention relates to a food product comprising pulses and other high starch seeds. Pulses include legumes, such as beans, that are typically dry as harvested and need reconstitution with water to prepare them for eating. Such pulses are typically harvested when they have matured and are dry. Pulses include: kidney beans, haricot beans, pinto beans, navy beans, lima beans, butter beans, adzuki beans, mung beans, black gram, scarlet runner beans, ricebeans, moth beans, tepary beans, broad beans, horse beans, field beans, dry peas, garden peas, protein peas, chickpeas, garbanzo beans, cowpeas, black-eyed peas, blackeye beans, pigeon peas, arhar/toor, cajan peas, congo beans, lentils, bambara groundnuts, earth peas, vetch, lupins, lablab, hyacinth beans, jack beans, sword beans, winged beans, velvet beans, cowitch and yam beans.

Pulses are typically dry and hard until cooked in water, making them chewable by a human. Their natural water content after harvest is on the order of about 10% total moisture by weight. Hydration and cooking of the pulse softens the texture to make them chewable and to change the taste profile. Hydration can be done as a one step process at elevated temperatures during a cooking step or in a multi step process, where the first step is soaking in water overnight prior to the cooking step. To have such pulses sold as ready to eat in hydrated form means that the product will need to be sterilized, and have added acid(s) or humectant(s), or other means of preservation. Pulses are sold to consumers both dry and fully hydrated (usually in an excess of water (or sauce) that is drainable) as in sealed metal cans. However, a typical cooked pulse is very soft and has little resistance to bite when chewed and are wet on the outside necessitating the use of an eating utensil for consumption to avoid finger soiling.

Thus, such pulses are: a) either fully hydrated by cooking necessitating some preservation means; or b) dry and inedible as is. The present invention overcomes this problem of edibility and provides a finished product, such as beans, that can be eaten as is as a snack or the like or incorporated into other food products without having to be additionally cooked. It also provides a traditional cooked bean taste and a firmer texture.

DESCRIPTION OF THE PRIOR ART

There is prior art that discusses the processing of beans and other starchy products. The discussions are taken from the respective disclosure and relate to those disclosures.

U.S. Pat. No. 6,183,797 relates to a method for producing a reduced water activity legume, with the legume first being fully hydrated after which, in a separate step, legumes are exposed to a liquid humectant to adjust the water activity down. The processed legumes are claimed to have a hydration level ranging between about 20% and about 65% total moisture, a water activity ranging between about 0.50 and about 1.0, and an amount of humectant equal to between about 0.1% and about 15% by weight of the legume. The method specifically requires that the hydration and humectant exposure steps be separate and that the humectant replace some of the original hydration water.

U.S. Pat. No. 4,510,164 discloses a process for producing storage stable beans from edible dried beans which comprises heating the dried beans, under pressure, in a humectant solution for a period of time sufficient to increase the moisture level of said beans to about 50-60 percent. Thereafter the moisture level of the beans is reduced in a drying apparatus from about 50 percent to an intermediate moisture level of about 30-40 percent. The resulting intermediate moisture level beans are then packaged in a low value vapor transmission container.

U.S. Pat. No. 5,863,591 discloses a process to shorten the cooking time of dried legume beans by subjecting the beans to a short-time, high-pressure, hydration. Significantly reduced cooking time follows, or cooking can be postponed for several months by storage in a refrigerator or more than several months in a freezer with reportedly no increase in cooking time for table-readiness and no degradation of quality.

U.S. Pat. No. 3,352,687 discloses dry legume seeds, e.g., lima beans, small white beans, smooth or wrinkled peas, etc. are impregnated with an aqueous hydration medium by application of vacuum release treatments, followed by soaking at ambient temperature in the medium. The hydrated seeds are then frozen and kept in frozen storage until ready for cooking and consumption. The hydration medium typically contains salt, a chelating agent such as sodium tripolyphosphate or the sodium salt of ethylenediamine tetraacetic acid, and sodium carbonate or bicarbonate.

U.S. Pat. No. 3,318,708 discloses a method of preparing quick-cooking legume seeds from edible dry legume seeds by subjecting the seeds while they are in contact with an aqueous hydrating medium to a vacuum, then releasing the vacuum, repeating the cycle of vacuum application and release until the skins of the seeds are swollen by entry of the water into the seeds. The seeds are maintained in contact with the water at ambient temperature and atmospheric pressure for a period long enough for the cotyledons to swell until they fill the swollen skins. The legumes are dried to a moisture content of about from 9.5 to 10.5%.

U.S. Pat. No. 3,291,615 discloses a method of preparing quick cooking, dried, whole beans or peas by subjecting dried, raw, whole beans or peas of commerce to a combination of steps including steaming, soaking, thorough cooking and controlled drying with sufficient heat to prevent the growth of micro-organisms that might cause odor and decomposition but also prevent any appreciable amount of splitting or butterflying.

U.S. Pat. No. 3,388,998 discloses a process of preparing a bean product comprising subjecting raw beans to heat and moisture to cook the beans and to increase their moisture content to between about 50-70% and then drying the beans to reduce the moisture content to about 10-15% by applying heat and sufficient pressure to substantially close any minor fissures and breaks which may have been created during the heating and drying.

U.S. Pat. No. 3,869,556 discloses bean processing where the beans are soaked in an aqueous hydrating medium containing sodium chloride, sodium bicarbonate, and sodium carbonate at atmospheric temperature and ambient pressure. The hydrated beans are then preserved by refrigerated or frozen storage or by dehydration. The end result reportedly is a quick cooking bean that retains its shell.

U.S. Pat. No. 4,729,901 discloses a process for preparing canned legumes. The process includes the steps of hydrating the legumes in a mixed salt solution for a period equal to about 7% to about 30% of the time needed to render the legumes fully quick-cooking, where a quick-cooking legume is one that may be cooked for the table in boiling water in 20 minutes or less, and then hermetically sealing the soaked beans in a container with a liquid different from said hydrating medium and thermally processing the container of legumes in a still retort until the legumes are cooked and commercially sterile. The hydrating solution contains sodium chloride and a buffer to maintain an alkaline pH, and may also include a chelating agent and a reducing agent. The reported result is a higher quality, fully hydrated and cooked canned bean.

U.S. Pat. No. 3,635,728 discloses a process for treating soybeans to remove bitterness and other undesirable taste qualities, and to tenderize the beans so that they can be cooked in a short time, all the while retaining the integrity of the beans. The procedural steps include a conditioning of the beans by a brief contact with boiling water, followed by soaking in an aqueous solution containing sodium chloride, a chelating agent, and an alkaline agent. The hydrated beans are then dried, for example, by contact with air at 130°-170° F. Alternatively, the hydrated beans may be preserved by freezing, or by partial dehydration followed by holding at refrigeration or even ambient temperatures.

U.S. Pat. No. 2,813,796 discloses a process of treating rice and other starchy vegetables to produce a quick-cooking product which can be quickly re-cooked to correspond in taste and appearance to ordinary cooked vegetables, comprising steeping the vegetable under water for a period of several hours until the vegetable is approximately saturated with water, cooking the vegetable under water, abruptly terminating the cooking by separating the vegetable from the cooking water, cooling the vegetable under non-drying conditions, freezing the vegetable by producing a rapid temperature drop to the freezing temperature of about 31°-32° F., maintaining the freezing temperature for a period of at least an hour, and thereafter producing a second rapid temperature drop, thawing the vegetable under non-drying conditions, and drying the vegetable without changing its appearance or flavor.

U.S. Pat. No. 3,203,808 discloses a process for the production of quick cooking, sometimes termed "instant" food products. The method is particularly directed to preparing quick cooking, dried, storage-stable, whole, discrete legumes, from similar hard, raw, dried, whole, discrete legumes that may be rapidly prepared for eating.

U.S. Pat. No. 3,108,884 relates to a process for rendering dried beans quick cooking. The invention relates primarily to dried beans, but may be applied to other similar seeds such as lentils, black-eyed peas and dried green peas. As is known, dried beans require a long cooking time. Normally this time is on the order of two and one half to three hours. In accordance with the present invention, the cooking time is reduced to about 35 minutes. The process involves soaking the dry beans in a phosphate solution at 40-55° C. for about 3 hours, and then drying the beans to about 6 to 10% moisture.

U.S. Pat. No. 3,495,989 discloses a quick-cooking foodstuff selected from the group consisting of seeds and alimentary pastes having at least 50 percent starch is prepared by steeping the foodstuff in an aqueous sodium chloride solution at 32° to 170° F. for a period of approximately 5 minutes to 72 hours until 3 to 30 weight percent of the increased weight is sodium chloride. The foodstuff can then be pasteurized and dehydrated. The seeds and alimentary pastes include cereal grains such as rice, wheat, and barley, as well as other edible seeds such as certain types of legumes, for example, peas, beans and lentils.

U.S. Pat. No. 5,545,425 relates to a process for preparing a shelf-stable, packaged, legume-containing product. The process includes: (a) preconditioning dry legumes by contacting the dry legumes with a sufficient amount of an initial water source and for a sufficient period of time to produce pretreated legumes having a moisture content in the range of from about 15 wt. % to about 35 wt. %; (b) hydrating the pretreated legumes by contacting the pretreated legumes with a sufficient amount of a secondary water source for a sufficient period of time to produce hydrated legumes having a moisture content in the range of from about 35 wt. % to about 55 wt. %, wherein the secondary water source is at a temperature in the range of from about 60° C. to about 95° C.; (c) combining the hydrated legumes with a vehicle, thereby producing a legume-containing mixture comprising from about 10 wt. % to about 55 wt. % of said hydrated legumes and a balance of said vehicle; and (d) charging the legume-containing mixture into a retort vessel; e) heating the legume-containing mixture in a sealed retort vessel at a temperature in the range of from about 110° C. to about 130° C. for a period of time in the range of from about minutes to about 150 minutes to produce a shelf-stable, packaged legume-containing product.

U.S. Pat. No. 4,159,351 discloses a mixed bean salad that is prepared by a process wherein different varieties of beans are independently rendered quick-cooking and then independently precooked for a period of time sufficient to remove extractable pigments therefrom. The precooked beans are independently cooled rapidly and then mixed together in a marinating liquid. Finally, the beans are finish-cooked in the marinating liquid.

U.S. Pat. No. 5,562,938 discloses fully cooked, starchy foodstuffs, such as rice and pasta that are preserved against microbiological spoilage by treatment with a predetermined quantity of an edible acid. Packages of fully cooked starchy foodstuffs are provided which are shelf-stable and are neutralized to a proper pH to avoid sourness. Ready-to-eat meals of neutralized acid preserved starchy foodstuffs are also provided. Edible alkaline neutralizing agents may be used to balance the pH.

U.S. Pat. No. 6,090,433 discloses a leguminous food product which generally retains the shape of the legume from which it was made and is formed from a variety of legumes such as pinto beans, red beans, black beans, navy beans, kidney beans, lentils and peas, etc. The leguminous food product is somewhat crisp and crunchy when chewed. It may be seasoned or flavored with salt, herbs, spices, etc. to achieve a variety of different desired tastes. The leguminous food product provides a nutritional source of protein and fiber which is low in fat and calories. The leguminous food product is formed by preconditioning, cooking, chilling, dehydrating, and enrobing the legumes.

SUMMARY OF THE INVENTION

The present invention involves the provision of a food product that includes one or more seeds such as a pulse. The seed is contained in a storage compartment in a package. The seed has a total moisture content in the range of between about 0.25 grams water/gram dry pulse matter and about 0.75 grams water/gram dry pulse matter, and a water activity in the range of between about 0.85 and about 0.97. The seed also has a firm texture and bite.

The present invention also involves the provision of a method including placing the seeds in water. In the presence of the water, the seeds are thermally processed until the seeds have a total water content in the range of between about 0.25 grams water/gram dry pulse matter and about 0.75 grams water/gram dry pulse matter, and a water activity in the range of between about 0.85 and about 0.97. The seeds have at least about 8% protein and at least about 50% carbohydrate by weight of dry seed matter. The thermal processing of the seeds can then be terminated after hydration and cooking are completed. The thermal processing gelatinizes the starch as indicated by loss of birefringence. The water absorption and thermal processing can be accomplished in one or multiple steps.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 3:
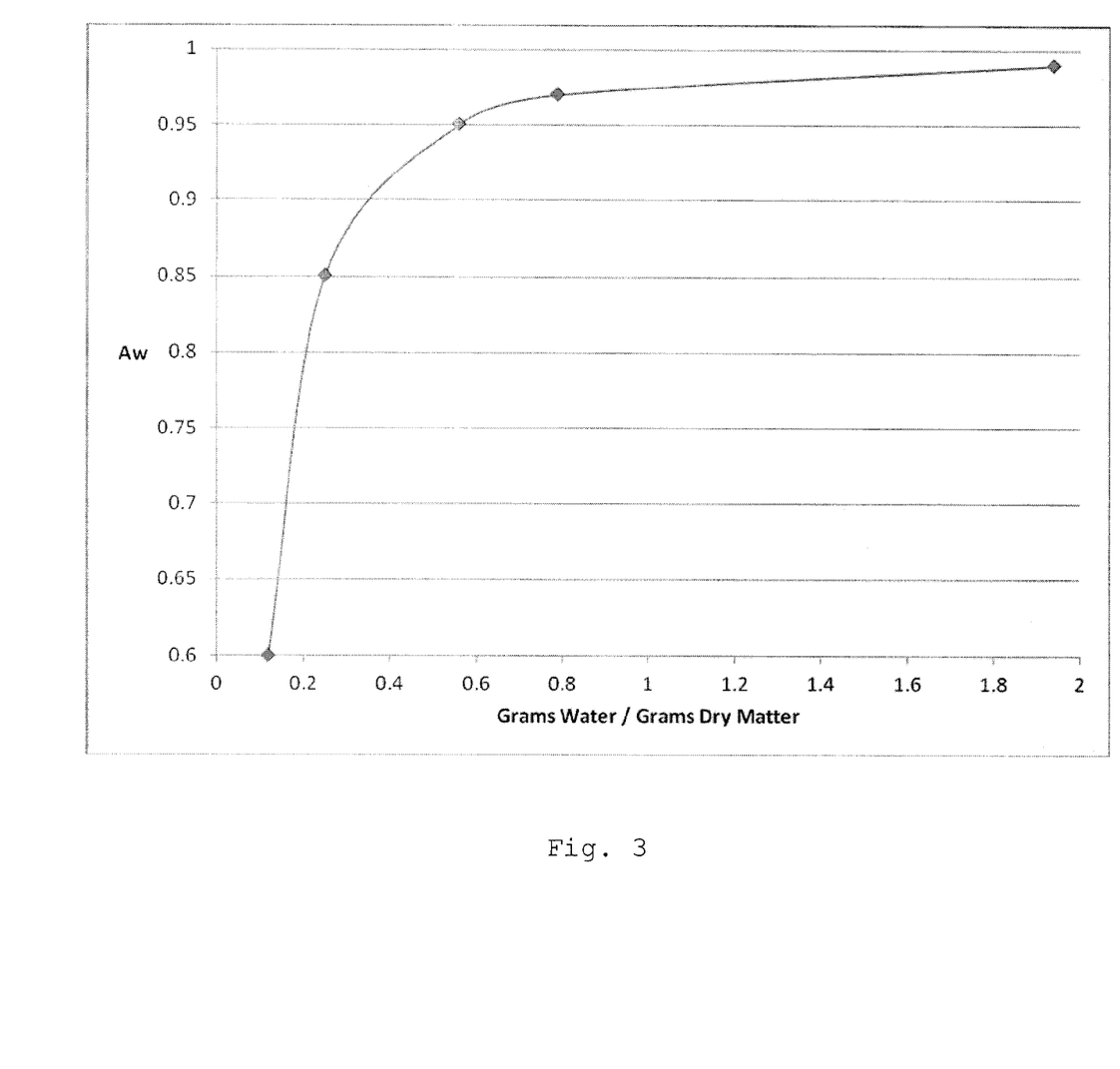
FIG. 3 is a graph showing a functional relationship between $A_w$ and the grams of water per gram of dry matter of beans.
Figure 4:
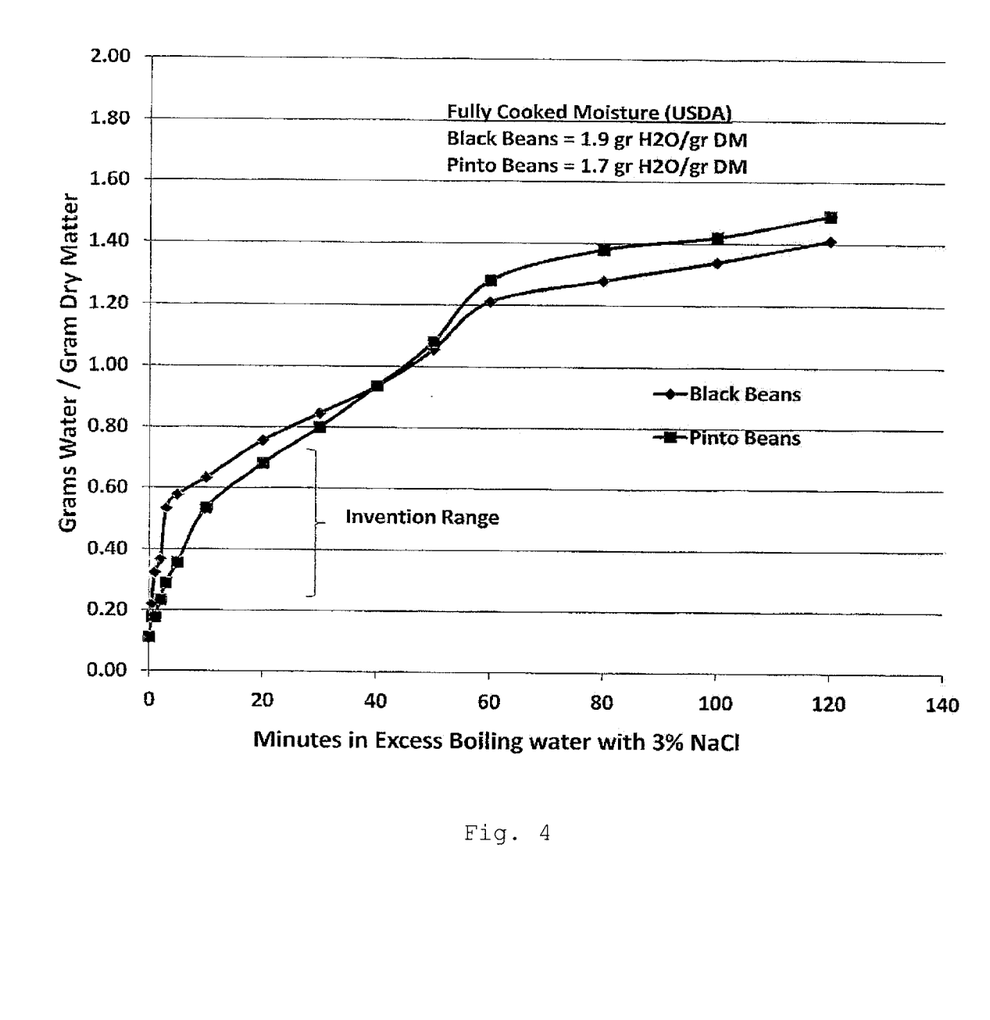
FIG. 4 is a graph showing a functional relationship between water content of two types of beans and cooking time in boiling water with 3% NaCl.

This Ready to Eat (RTE) product is a seed such as a pulse or a cereal grain, exclusive of corn, that contains protein and a substantial amount of carbohydrates including starch. The processed seed is substantially fully cooked, i.e., the starch is substantially gelatinized as indicated by the loss of birefringence under polarized light. When the invention includes a pulse which are typically provided fully cooked and with drainable water it has a moisture content that is significantly less than typical fully cooked/hydrated pulses. Cooked beans, depending on the variety, as seen in FIG. 4 and according to USDA published data, have a moisture content in the range of about 1.5 to 2.3 grams of water per gram of dry matter with the USDA values being higher. The invention will be described in terms of a pulse, but is applicable to and includes other seeds such as cereal grains having a protein content in excess of about 8% and a carbohydrate, including starch, level in excess of about 50% by weight of dry matter but exclusive of corn. The starting total moisture content of the pulse is below about 15% and typically about 10% by total weight of the pulse. The pulse is hydrated as described herein; resulting in a pulse such as a bean having a total moisture content of a processed pulse is about 15-45% of that of a typical fully cooked pulse (e.g. canned beans). The processed pulses have a water activity ($A_w$) of less than about 0.97, and preferably in the range of between about 0.85 and about 0.97, and more preferably in the range of between about 0.93 and about 0.96, see FIG. 3. With these water activity levels and appropriate thermal processing, an acidulant or other preservative need not be added to the pulses for microbial stability. In a preferred embodiment, the pulses are thermally processed sufficiently to provide a commercially sterile product that is particularly suited as a shelf stable product. For some forms of the invention, the pulses can be processed to be pasteurized. The processed pulses are contained in packaging for storage and distribution with a plurality of pulses being contained in a package and still being in whole and integral form. The starting seed is preferably as harvested and typically dry as described.

Figure 2:
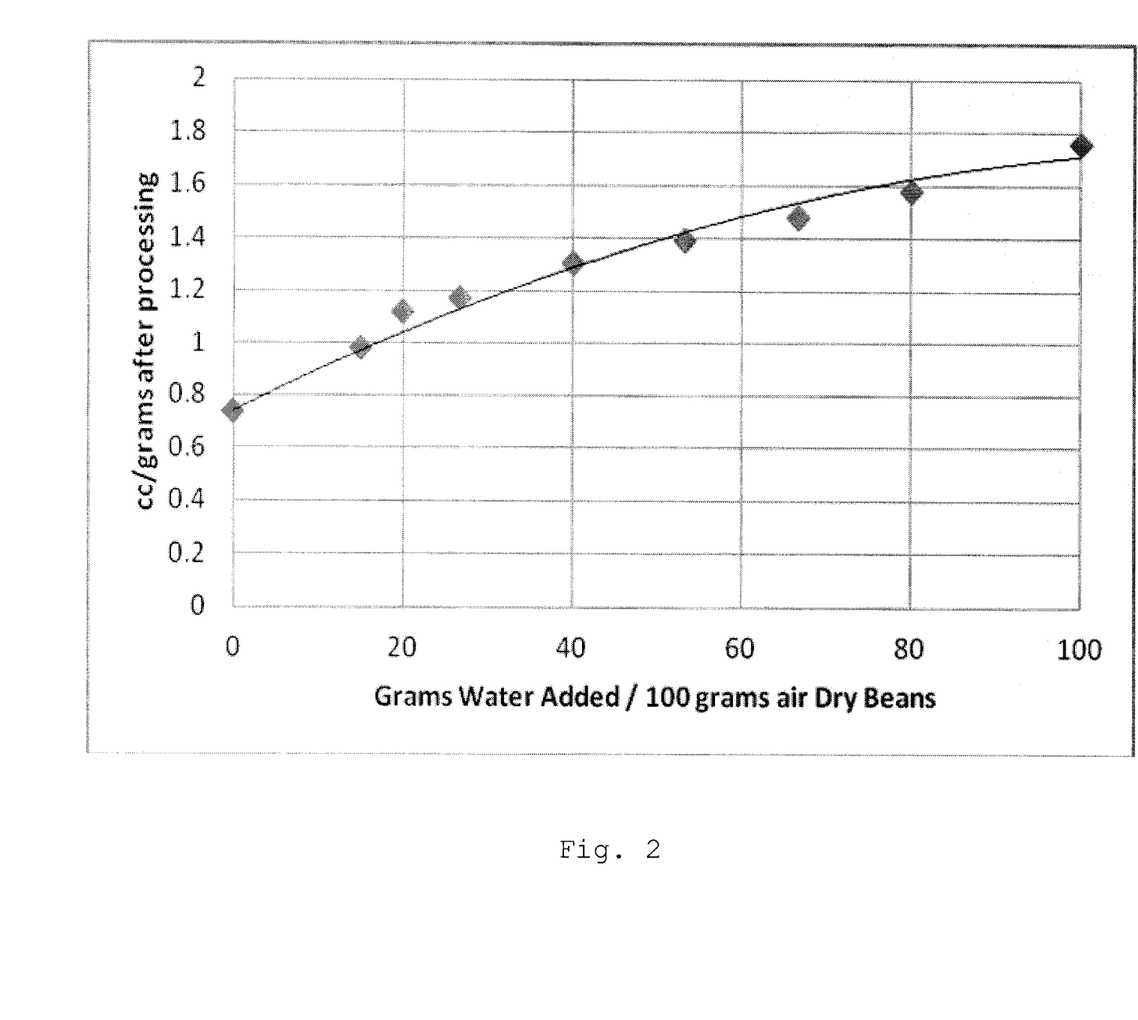
FIG. 2 is a graph showing volume per gram of bean as a function of added water illustrating bean swelling due to added water.

The product includes a pulse that has its starch component substantially completely gelatinized as indicated by a substantial quantity, at least about 75% of the starch cells being gelatinized as indicated by loss of birefringence under polarized light, a test well known in the art. The $A_w$, water activity, can be measured by an Aqualab Dewpoint water activity meter. In general, the higher the $A_w$, the more one will do to the product or its storage environment to achieve microbial stability. This is currently regulated by the FDA in the United States. The inventive product is contrasted to a fully hydrated pulse product having an $A_w$ of about 0.99, see FIG. 3. $A_w$ is defined as the vapor pressure of a liquid divided by the vapor pressure of pure water at the same temperature. The total water content of the pulses after thermal processing is below about 0.75 grams of water per gram of dry matter or about 43% by product weight, and preferably in the range of between about 0.25 grams water/gram of dry matter (20%) and about 0.75 grams water/gram of dry matter (43%), and more preferably in the range of between about 0.35 grams water/gram of dry matter (26%) and about 0.75 grams water/gram of dry matter (43%) and most preferably in the range of between about 0.45 grams water/gram of dry matter (31%) and about 0.65 grams water/gram of dry matter (39%). The inventive broad range of water is shown on FIG. 4. This figure also shows the starting moisture of a pulse at about 10% total water content. These invention water content values are achieved in the hydration/cooking (thermal processing) which saves energy as compared to prior art methods using full hydration and then drying and/or adding a liquid humectant to replace absorbed water. It has been found that the partial hydration provides a different texture while still providing a high quality food product well adapted for storage and distribution and having good organoleptic properties. The pulses also retain their original shape but are expanded in volume from water absorption and maintain their original integrity, see FIG. 2 which shows specific volume of beans as a function of water content.

The processed pulses or other seeds are packaged with the above described properties of water activity and/or total water in a package suitable for retail sales, such as a substantially sealed package. Such a package can be a sealed flexible polymeric pouch, a sealed tub, jar or can with effective barrier properties to gas and water exchange with the exterior environment. It is preferred that the package contain little if any drainable water, i.e., any water not initially contained in the pulses. The drainable water content in the package is less than about 10% by total weight of the pulses, preferably less than about 5% by total weight of the pulses, and more preferably no drainable water. Thus, the pulses or other seeds as available in the package will be relatively dry to the touch and can be eaten directly and without further processing as a snack food without appreciable soiling of the fingers. For normal retail products, the package will contain between about 2 ounces and about 32 ounces of pulses therein. It is contemplated, though, that larger packages can be provided for bulk sales and food service sales. The processed pulses can be distributed and stored either as a shelf stable food or as a refrigerated food, or even as a frozen food product (refrigerated and frozen storage can be referred to collectively as cold storage) while still being microbially stable. For any storage condition of products in sealed packages, $A_w$ is not a factor if the product is commercially sterile. If the product is not commercially sterile, the storage conditions of such packaged products can then become an issue as well as the $A_w$. This is well known in the art and is currently regulated. The above described water activity is achieved without the use of any substantial amount of liquid humectant like glycerin, although some water activity reduction could be achieved by solids dissolved in the water used to hydrate the pulses such as salt or sugar which would be added primarily for taste.

The processed seeds of the present invention do not need a humectant added for the purpose of the control of $A_w$. However, compounds added for their flavor impact, such as salt or sugar, will of course also affect the water activity. The inventive processed seed has an added normally dry humectant, if any, preferably of less than about 10% by weight of the dry seed matter and total moisture, and more preferably less than about 5% by weight. The inventive seed has no or substantially no added liquid humectants such as glycerin or other polyols since their only function is to adjust $A_w$. If added, the liquid humectant(s) will be present in an amount of less than 3% by weight of the dry seed matter and moisture.

The thermally processed pulses are packaged in a manner such as to provide an acceptable shelf life. A preferred embodiment of this technology is to cook the pulses, along with their hydration liquid, in their final package such as a consumer package where the amount of hydration liquid is limited but present in an amount that, when absorbed by the pulses, results in the desired water activity and total water amount as described herein. With an appropriate amount of thermal processing (amount of cooking), this will give a storage stable product. The thermal processing can be adequate to commercially sterilize the product or pasteurize the product as described below. Different storage conditions, e.g., shelf stable or refrigerated, are one factor used in determining the degree of thermal processing and degree of sterilization or pasteurization.

A processed pulse product has a very pleasant flavor and texture, which can be expanded upon by the addition of seasoning, such as salt, sugar and spices. It is envisioned that the inventive food product can be eaten as a snack or as a component of a salad or meal or even as a meal. The processed pulse product can also be used as a quick cooking bean, when subsequently cooked with additional water.

The processed pulse product can have flavors developed in situ. The dry pulse or other seed, before hydration as described herein, may be processed to develop flavors. One means is to roast the seed at a suitable temperature for a suitable time to develop a desired flavor. Preferably the roasting does not go beyond "first crack", a condition well known to coffee roasters. The roasting time and temperature can be selected to develop the desired intensity and flavor. The seeds are then processed as described herein.

Figure 1:
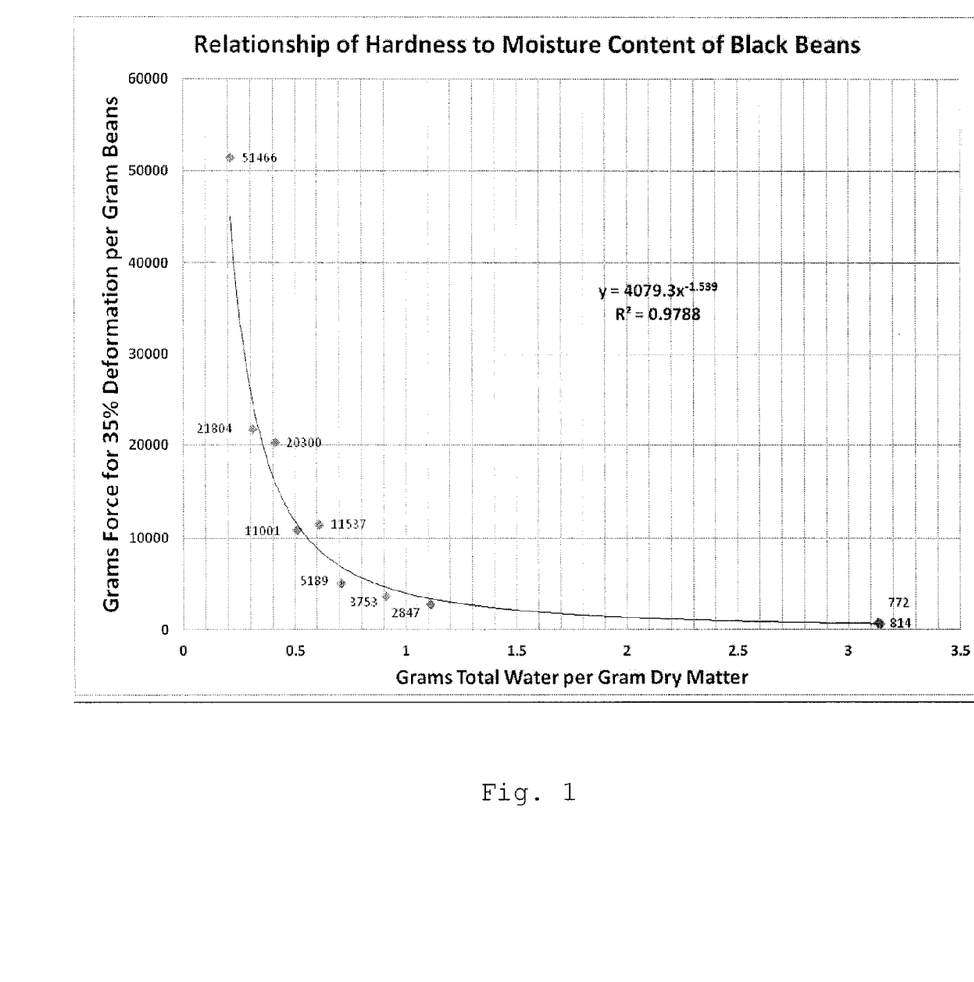
FIG. 1 is a graph showing the force (firmness) per gram of pulse to compress the thickness of the pulse 35% from its original thickness as a function of total water in the pulses.

The texture is firm as compared to a pulse that has been fully cooked and hydrated and takes more force to make a pulse yield under compression (chew or bite) than a conventionally processed pulse. With regards to a bean product, a regularly processed bean can be readily compressed between ones fingers with little resistance, while the inventive bean takes much more effort to compress. This is readily apparent from the charts in FIG. 1. FIG. 1 illustrates compression force needed to decrease bean thickness 35% as a function of total water content of the beans. Fully hydrated and cooked beans have a total water content of 3.2 grams per gram of dry bean matter and have a force value of about 800 grams; while beans of the invention at the high end of water content of 0.75 grams of total water per gram of dry matter have a force value of 6,300 grams. (The force values are standardized for the size of the bean by dividing the compression force by the weight of the sample to give a value of force per gram of sample. A one pulse sample is used.) It is to be noted that the beans used in the production of these charts are contoured or shaped differently than a standard sample would be for such testing, changing the shape of the curves because the samples do not have a uniform cross section. The hardness of the beans for a water content range of 26% and 43% as described above is in the range of between about 6,000 grams per gram of product and about 21,000 grams per gram of product as measured on a TexVol TVT-300XP texture analyzer using a single pulse as a sample according to FIG. 1. During testing, the pulse has its major transverse plane generally perpendicular to the direction of force application. The inventive pulse has a hardness using this method of hardness testing is at least about 6,000 grams per gram of product, and preferably in the range of between about 6,000 grams per gram of product and about 21,000 grams per gram of product. The pulse was compressed by 35% of its thickness in this dimension.

In addition, if a traditional fully hydrated and cooked pulse product like a bean is desired, the product can be reheated with additional water for approximately 15 minutes and a very high quality, fully hydrated and fully cooked product is obtained that is ready for consumption.

Since the inventive product is only partially hydrated, it has a much lower weight and volume than a traditional fully hydrated and cooked product such as beans. As such, it is a more environmentally friendly product and has a volume and weight more similar to that of "dried" beans than fully hydrated and cooked (canned) beans as an example. The product is energy efficient to produce in a preferred embodiment by not needing to heat more water than is needed for hydration.

The above described food product can be produced by the following processes. The pulses are hydrated in a manner to limit water uptake to the above levels of total moisture. The pulses are also thermally processed to commercially sterilize or pasteurize if desired, but sufficiently to effect cooking to gelatinize the starch as above described and to soften the texture as described herein while leaving the pulses in an integral intact form. Hydration can also soften the texture. It is preferred that the final texture be firm to the bite. Sterilization is a preferred product achievement for shelf stable product.

The process may have the hydration and thermal processing as separated steps, combined into one step or a combination such as a partial hydration as by soaking and completing hydration during thermal processing. It is preferred that, for retail product, the method be a one step process, by hydrating during thermal processing.

The hydration is preferably done by exposing so-called dried pulses to moisture such as liquid or steam. Typically, the pulses, before processing, are dried naturally while maturing at the end of the growth cycle. However, some drying may be effected after harvest, such as when a crop is picked wet or was picked prior to full field drying. Drying is sometimes done during storage to prevent microbial growth on the pulses. Prior to hydration, the pulses are typically "dry", i.e., have a total moisture content of less than about 15% and generally less than about 10-11% by weight total moisture. The process to hydrate and thermally process the pulses to achieve the final water content, water activity and gelatinization can vary. In any of the processes, the pulses are exposed to moisture and to heat and in a preferred embodiment; the exposure to moisture and elevated temperature is done simultaneously. The pulses in the preferred embodiment herein described are in an environment that has limited moisture available for absorption, i.e., only enough moisture to achieve the desired final moisture content. This eliminates $A_w$ as a process control point. When the thermal processing and hydration are done in the product package, it has been surprisingly found that the final moisture content and cooking are fairly uniform for the pulses in a package, particularly when the packages are rotated during the thermal processing.

The hydration and thermal processing can be done in the final product package or in a large batch or continuous cooker and then packaged as described above. When the dry pulses are exposed to moisture such as liquid water, the pulses absorb water and are heated to assist in water absorption and starch gelatinization over a period of time to achieve both the above water content and water activity in addition to the desired gelatinization. Alternately, the hydration can be accomplished partially or completely at refrigerate temperature, room temperature or an elevated temperature for a time sufficient to make the total water content in the above described ranges after which the pulses can be thermally processed. Generally, the higher the temperature, the faster the hydration and gelatinization will take place. Thermal processing can be done at processor temperature of between about 90° C. and about 130° C. which would be the temperature of the environment surrounding the pulses or the packaged pulses. Hydration time for beans can be long when hydrated at room temperature. The hydration time can range from about 2 hours to about 12 hours.

It has been found that, in the preferred process, limiting the water available for hydration can be very effective and simple in controlling the final total water content of the beans. This can eliminate much equipment and process line cleaning as well as waste water as is typically needed in conventional processing. One can readily determine the amount of water needed to increase the water content of the pulses to the desired total water content (and final product package weight which is a regulated factor and is a current government labeling requirement) making the hydration process easy to control without as much pulse quality testing for this property. When the hydration water is absorbed and there is little or no interstitial or drainable water as described above, the pulses are ready for further processing or handling.

The pulses may also be hydrated in an excess of water or a mixture of water and seasoning such as salt (NaCl) and other optional seasoning such as savory, thyme or basil. The total moisture uptake is then controlled by the time of hydration as can be seen in FIG. 4 and the temperature of the water. The following table shows the time in minutes for beans to reach 0.55 gr. total water/gr. of dry matter for various water temperatures:

| Bean | 110 F. | 160 F. | 212 F. |
|---|---|---|---|
| Black | 17.7 min. | 5.31 | 3.75 |
| Pinto | 96.0 | 28.5 | 11.2 |

If seasoning or other dry materials are added, or a water containing sauce is added to the final product, it is an easy matter to adjust the water content to achieve the desired total water content in the final product after any moisture equilibration. Spices, flavors and seasoning such as salt and the like can be included in the hydration water if desired. It is also possible to apply a water based coating on the processed pulse, for example a barbecue sauce or a honey sauce by proper adjustment of its water content and/or free water to control moisture migration between the pulse and the sauce. An encapsulant or moisture barrier on the pulse could also be used to limit moisture migration, or the moisture content of either or both the pulse and the sauce could be picked such that the moisture will migrate but achieve the final desired moisture content in the pulse. The processed pulses can be assembled in a cluster or bar type product with the use of a suitable adhesive material such as one of the above mentioned sauces to bind the pulses together. The binder can include protein, gum and carbohydrate like sugar, gelatinized starch, starch, hydrocolloids and combinations thereof.

The pulses are thermally processed to effect cooking and preferably sterilization or pasteurization depending on the desired subsequent storage and distribution conditions. Sterilization or pasteurization can be accomplished otherwise as is known in the art, for example, irradiation. Cooking is at a temperature for a time to effect starch gelatinization and texture change. The cooking, if it is also to effect sterilization or pasteurization is at a temperature such that the pulses and moisture reach a temperature in the range of between about 110° C. and about 130° C., and preferably in the range of between about 115° C. and about 120° C. for commercial sterilization, and in the range of between about 80° C. and about 100° C., and preferably in the range of between about 90° C. and about 100° C. for pasteurization. The thermal processing is conducted over a time period in the range of between about 10 minutes and about 60 minutes, and preferably in the range of between about 20 minutes and about 40 minutes for commercial sterilization, and over a time period in the range of between about 5 minutes and about 60 minutes and preferably in the range of between about 10 minutes and about 30 minutes for pasteurization. The thermal processing is preferably adequate to be a 12 D botulism process for the pulses when commercial sterilization is sought. The product is finished cooking when the starch therein is gelatinized as previously described. The thermal processing also should be sufficient to eliminate an undesirable raw flavor and generate desirable cooked and savory notes.

The thermal processing can be done in a retort with the pulses already packaged as described herein. The packages of product can be rotated during retorting. It has been found that a very effective means of thermal processing is to put the pulses in their consumer package, add enough water to achieve the desired total water content and water activity, seal the package and effect hydration and thermal processing of the pulses in the package. This has been found to very effectively limit water absorption, effect microbial stability and effect processing in a plant with little equipment cleaning. It also eliminates hydration as an $A_w$ control point in the process since the retorting process can yield a commercially sterile product including the package.

If the pulses are hydrated and then packaged, any suitable package and packaging equipment can be used. The pulses are packaged preferably without adding drainable water. Prior to packaging, flavors, spices and seasoning can be added as desired.

The following examples are provided:

Example #1

Black Beans were partially hydrated with a controlled amount of water, salt and sucrose prior to thermal processing.

Black beans (100 grams of air dry (~10% moisture)) were placed in a glass container, to which was added 40 grams of distilled water, 1.2 grams of salt and 2 grams of sucrose. The beans, water, salt and sucrose was stored at 4 C for about 18 hours, during which time the beans absorbed approximately all of the water/sucrose/salt solution. The partially hydrated beans were then processed in a retort at ~15 PSIG, ~121° C. for 50 minutes. The beans were allowed to cool to room temperature and had a very appealing chewy texture and flavor. The water activity of the beans was approximately 0.95.

Example #2

Black Beans were partially hydrated during thermal processing with a controlled amount of water, salt and sucrose. Black beans (100 grams of air dry (~10% moisture)) were placed in a glass container, to which was added 40 grams of distilled water, 1.2 grams of salt and 2 grams of sucrose. Without allowing time for the beans to equilibrate with the solution, they were processed in a retort at ~15 PSIG, ~121° C. for 50 minutes. During this thermal processing, the beans absorbed substantially all of the water/sucrose/salt solution. The beans were allowed to cool to room temperature and had a very appealing chewy texture and flavor, which was very similar to that of the beans in Example #1. The moisture content of the beans was approximately 0.56 grams water/gram dry matter and their water activity was approximately 0.95.

Example #3

Black Beans were partially hydrated in excess water for a controlled amount of time prior to thermal processing. Black beans (100 grams of air dry (~10% moisture)) were placed for 3 minutes in approximately 5 liters of boiling water which included 3% salt and 0.1% dry savory seasoning. After this treatment, the moisture content of the beans was approximately 0.53 grams water per gram dry matter. The beans were then drained and processed in a retort at ~15 PSIG, ~121° C. for 50 minutes. The beans were allowed to cool to room temperature and had a very appealing chewy texture, which was similar to that in Examples #1 and 2. The flavor had a pleasant savory note. The water activity of the beans was approximately 0.95.

The invention, as described above can be used on other seeds and in particular cereal grains such as buckwheat, wheat, pearled barley, oats, etc, but not corn. When cereal grains are used, it is preferred that they be in groat form. Corn does not hydrate in whole kernel form as do the other seeds tested which includes pearled barley, buckwheat groats, oat groats, black beans, light red and dark red kidney beans, navy beans and lima beans. The seeds of the present invention have a carbohydrate content above about 50% and a protein content above about 8% by weight of total dry matter.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A food product including at least one seed, said product including:
    a package containing at least one seed, said package having a storage compartment with said seed therein;
    said seed being intact and having a total moisture content in the range of between about 0.25 grams water/gram dry matter and about 0.75 grams water per gram dry matter, a water activity in the range of between about 0.85 and about 0.97 and having starch therein with a substantial portion of the starch being gelatinized as indicated by loss of birefringence.

2. The food product of claim 1 including a plurality of seeds in said storage compartment and said water content being in the range of between about 0.35 grams water/gram dry matter and about 0.75 grams water per gram dry matter.

3. The food product of claim 2 wherein said storage compartment containing less than about 10% by weight of the seeds of drainable water.

4. The food product of claim 2 wherein the seeds having a total moisture content of between about 0.45 grams water/gram dry matter and about 0.65 grams water/gram dry matter and a water activity in the range of between about 0.93 and about 0.96.

5. The food product of claim 2 wherein the seeds having a protein content in excess of about 8% and a carbohydrate content in excess of about 50% by weight of dry matter.

6. The food product of claim 5 wherein the seeds including pulses.

7. The food product of claim 6 wherein the pulses including beans.

8. The food product of claim 5 wherein the seeds including at least one cereal grain exclusive of corn.

9. The food product of claim 8 wherein the cereal grain being in groat form.

10. The food product of claim 5 wherein the seeds having a hardness of at least about 6000 grams per gram of product.

11. The food product of claim 10 wherein the seeds having a hardness in the range of between about 6000 grams per gram of product and about 21,000 grams per gram of product.

12. The food product of claim 3 wherein at least some of said seeds being adhered together and being in the form of a bar.

13. The food product of claim 1 wherein the at least one seed having been roasted.

14. A method of processing seeds selected from pulses and cereal grains excluding corn having a protein content above about 8% and a carbohydrate content, including starch above about 50% by weight of dry matter, the method including:

exposing the seeds to moisture;

allowing the pulses to absorb moisture until the pulses have a total water content in the range of between about 0.25 grams water/gram dry matter and about 0.75 grams water per gram dry matter of seeds and a water activity in the range of between about 0.85 and about 0.97; and thermally processing the seeds to at least partially gelatinize the starch in the seeds as indicated by loss of birefringence and then stopping the thermal processing.

15. The method of claim 14 including packaging the processed seeds.

16. The method of claim 15 wherein the seeds being packaged prior to thermal processing.

17. The method of claim 16 wherein the moisture is in the form of liquid water and including adding the water to the package prior to the thermal processing, the added water being in an amount to produce the total water content in the range of between about 0.25 grams water/gram dry matter and about 0.75 grams water per gram dry matter with no more than about 10% drainable water.

18. The method of claim 15 wherein the seeds being packaged after the thermal processing.

19. The method of claim 14 wherein the thermal processing being at a temperature in the range of between about 80° C. and about 125° C.

20. The method of claim 14 wherein the seeds including pulses.

21. The method of claim 20 wherein the seeds including a cereal grain exclusive of corn.

22. The method of claim 14 including roasting the seeds prior to said exposing the seeds to moisture.

23. A thermally processed seed containing food product selected from pulses and cereal grains exclusive of corn, the seed having starch and a hardness of at least about 6,000 grams per gram of product, the seed having an $A_w$ in the range of between about 0.85 and about 0.97 and a total water content in the range of between 0.25 grams water/gram dry matter and about 0.75 grams water per gram dry matter of seed and with a substantial portion of said starch being gelatinized as indicated by loss of birefringence.

24. The product of claim 23 wherein the seed having a water content in the range of between about 0.35 grams water/gram dry matter and about 0.75 grams water per gram dry matter.

25. The product of claim 24 wherein the seed including a plurality of pulses.

26. The product of claim 24 wherein the seed being in a plurality and including at least one cereal grain.

27. The product of claim 26 wherein the cereal grain being in groat form.

28. The product of claim 23 wherein the seed being in a substantially sealed package.

29. The product of claim 24 wherein the seed being in a plurality and adhered together to form a bar.

30. The product of claim 29 wherein the plurality of seeds being cereal grain.

* * * * *